United States Patent
Kennedy

(10) Patent No.: US 11,961,178 B2
(45) Date of Patent: Apr. 16, 2024

(54) REDUCTION OF THE EFFECTS OF LATENCY FOR EXTENDED REALITY EXPERIENCES BY SPLIT RENDERING OF IMAGERY TYPES

(71) Applicant: Roderick V. Kennedy, Liverpool (GB)

(72) Inventor: Roderick V. Kennedy, Liverpool (GB)

(*) Notice: Subject to any disclaimer, the term of this patent is extended or adjusted under 35 U.S.C. 154(b) by 107 days.

(21) Appl. No.: 17/610,135

(22) PCT Filed: May 11, 2020

(86) PCT No.: PCT/IB2020/054425
§ 371 (c)(1),
(2) Date: Nov. 9, 2021

(87) PCT Pub. No.: WO2020/229995
PCT Pub. Date: Nov. 19, 2020

(65) Prior Publication Data
US 2022/0222888 A1    Jul. 14, 2022

Related U.S. Application Data

(60) Provisional application No. 62/846,228, filed on May 10, 2019.

(51) Int. Cl.
*G06T 15/50*    (2011.01)
*A63F 13/358*    (2014.01)
(Continued)

(52) U.S. Cl.
CPC .......... *G06T 15/503* (2013.01); *A63F 13/358* (2014.09); *G06T 1/20* (2013.01);
(Continued)

(58) Field of Classification Search
None
See application file for complete search history.

(56) References Cited

U.S. PATENT DOCUMENTS 6,377,257 B1    4/2002    Borrel et al.
10,268,892 B1 *    4/2019    Miller ................ G06F 1/1626
(Continued)

FOREIGN PATENT DOCUMENTS

WO    18060334 A1    4/2018

OTHER PUBLICATIONS

Moeira Andre et al: "Hybrid Cloud Rendering System for Massive CAD Models", 2018 31st SIBGRAPI Conference on Graphics, Patterns and Images ( SIBGRAPI ), IEEE, Oct. 29, 2018 (Oct. 29, 2018), pp. 234-241.

(Continued)

*Primary Examiner* — Patrick F Valdez
(74) *Attorney, Agent, or Firm* — Fishman Stewart PLLC

(57) ABSTRACT

A method for reducing the effects of latency in an extended reality (XR) experience is disclosed. The method includes: i) distinguishing between two types of imagery to be rendered; ii) differentially computing and communicating data, dependent upon the imagery type, such that when the imagery is of: a) a first type, which is background or distant imagery, it is rendered in a known frame of reference by a server and sent to a user's device from the server where it is transformed to a second frame of reference by the user's device and re-rendered; and b) a second type, which is fast-moving imagery, fast-changing imagery, or imagery very close to a user's point of view relative to the first type imagery, it is rendered locally by the user's device; and iii) compositing the first type imagery and the second type imagery, by the user device.

23 Claims, 3 Drawing Sheets

(51) Int. Cl.
*G06T 1/20* (2006.01)
*G06T 1/60* (2006.01)
*G06T 15/20* (2011.01)
*G06T 19/00* (2011.01)
*H04L 67/131* (2022.01)

(52) U.S. Cl.
CPC ............... *G06T 1/60* (2013.01); *G06T 15/20* (2013.01); *G06T 19/006* (2013.01); *H04L 67/131* (2022.05); *G06T 2210/08* (2013.01)

(56) References Cited

U.S. PATENT DOCUMENTS

| | | | | |
|---|---|---|---|---|
| 2007/0248283 | A1* | 10/2007 | Mack | G06T 5/002 348/E5.022 |
| 2010/0198876 | A1 | 8/2010 | Estok | |
| 2012/0313944 | A1* | 12/2012 | Kontkanen | G06T 15/506 345/426 |
| 2018/0350036 | A1* | 12/2018 | VanReenen | H04N 1/3935 |
| 2019/0122642 | A1* | 4/2019 | Morein | G09G 5/006 |
| 2020/0004460 | A1* | 1/2020 | Gould | G06F 3/0613 |
| 2020/0094141 | A1* | 3/2020 | Fersch | A63F 13/213 |
| 2020/0097179 | A1* | 3/2020 | Matsushita | G06F 3/0641 |
| 2020/0098186 | A1* | 3/2020 | Xue | H04N 21/6587 |
| 2020/0175759 | A1* | 6/2020 | Russell | G06F 18/214 |
| 2021/0084278 | A1* | 3/2021 | Harviainen | H04N 13/332 |
| 2021/0142442 | A1* | 5/2021 | Musiienko | G02B 27/0172 |

OTHER PUBLICATIONS

Neumann L et al: "An Approach for an Adaptive Visualization in Mobile Environment", Electronic Publishing, Artistic Imaging, and Digital Typography; [ Lecture Notes in Computer Science , ISSN 0302-9743], Springer Verlag, DE, vol. 1309, Sep. 10, 1997 (Sep. 10, 1997) , pp. 272-282.

Liqiang Zhang et al: "Web-based visualization of large 3D urban building models ", International Journal of Digital Earth, Mar. 15, 2012 (Mar. 15, 2012), pp. 1-15.

Noguera J M et al: "Navigating Large Terrains using Commodity Mobile Devices", Computers and Geosciences, Pergamon Press Oxford, GB, vol. 37, No. 9, Sep. 1, 2021, pp. 1218-1233.

* cited by examiner

REDUCTION OF THE EFFECTS OF LATENCY FOR EXTENDED REALITY EXPERIENCES BY SPLIT RENDERING OF IMAGERY TYPES

CROSS-REFERENCE TO RELATED APPLICATIONS

This application claims priority to International Patent Application No. PCT/IB2020/054425 filed May 11, 2020, which also claims priority to U.S. Provisional Patent Application No. 62/846,228 filed May 10, 2019, the contents of each of which is hereby incorporated by reference in its entirety.

TECHNICAL FIELD

The present invention relates to extended reality (XR). In particular, but not by way of limitation, the present subject matter provides systems, computer programs and methods for reducing or otherwise addressing the effects of latency on XR experiences, such as virtual reality (VR), mixed reality (MR) and augmented reality (AR). In one embodiment a "split latency" approach is taken, in which data streams are managed depending on their type.

BACKGROUND

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

XR experiences, applications, and games, such as VR or AR, require low latency (typically below 20 milliseconds), high frame rates (typically above 90 fps), and hardware that is not too cumbersome in order for users to have a comfortable and easily useable experience. In particular, latency, the response time between an input from the user and the result of that input being shown to the user, is important to XR experiences because only with sufficiently short delays can such experiences provide the user with the sense of immersion which is their main distinguishing feature. However, a conflict exists between XR technology that is convenient to use by a wide variety of users such as mobile VR/AR technology, and XR technology that produces high quality experiences. In general, mobile XR technology, such as standalone VR headsets and AR glasses, is not very powerful, and hardware that is powerful is not convenient for XR experiences due to its large size and weight. Mobile XR devices are intended to be light and small enough to be worn by a typical person for periods from several minutes to longer without discomfort or significant physical effort. They are therefore not very powerful, because when all other factors are equal, a computer's power can usually only be increased at the expense of additional weight or power consumption, the latter of which, in turn, leads either to additional weight or shorter battery life. Companies producing mobile XR experiences, applications, and games within the hardware limits of mobile devices and by local rendering tend to produce applications that are more simplistic than those designed to run on a PC or non-mobile game console. On the other hand, companies producing high-end, high-quality applications with immersive technology are not producing applications and technology that are accessible to the vast majority of consumers because of the high costs and inconvenience of high-performance devices. Additionally, in some instances, high-end experiences are tethered to a personal computer (PC) or game console, for example, tethered by a wire or WiFi, which limits intuitive actions, immersion, and limits the experience to a fixed location.

The video game industry has developed some solutions to similar hardware problems by running and rendering games in the cloud, rather than locally, and streaming rendered content directly to a consumer's device over the internet. Some commercial game streaming systems include Google Stadia and PlayStation Now. Such an approach introduces latency that is not present in a program running locally on a home PC or game console. This latency can be between 60 and 200 milliseconds or higher, which may be acceptable to the video game industry, but is too high for immersive technology because high latencies with XR technology leads to nausea and a sense of dislocation. Therefore, commercial XR streaming systems untethered from local hardware have yet to be produced since the latency problem has not been solved.

There remains a need to improve the quality of experience of lightweight mobile XR technology in order to make high quality XR technology accessible and affordable to the mass market without relying on additional networking infrastructure, such as 5G, and additional local computing power.

A further problem is that central processing units (CPU's) and graphic processing units (GPU's) operate asynchronously. When the CPU picks up an image to send over the network, it is hard to know how old it is, and data such as, but not limited to, camera position and or orientation, will usually have changed. Thus, in order to associate a frame-of-reference with an image-frame, it is difficult to ensure the correct position/orientation is associated with the corresponding frame.

Definitions

Latency. This is the amount of time a package of information takes to traverse a system. In a computer network, it is an expression of how much time it takes for a packet of data to get from one designated point to another. It is sometimes measured as the time required for a packet to be returned to its sender. In order to address latency issues in XR applications the latency should be less than 20 milliseconds, more preferably less than 15 milliseconds and more preferably still less than 10 milliseconds.

Frame rate. Expressed in frames per second or (FPS) it is the frequency (rate) at which consecutive images called frames appear on a display. The term applies equally to film and video cameras, computer graphics, and motion capture systems. Frame rate may also be called the frame frequency, and be expressed in hertz. To provide high quality visuals a frame rate of greater than 60 FPS, more preferably 90 FPS and more preferably still 120 FPS is desired.

Frame of Reference. A coordinate system, and the numerical values that uniquely locate and orient the coordinate system in dimensional (e.g. 3D) space.

Persistence of Validity. This is a measure of for how long a time and to what extent a rendered image or part of an image e.g. a pixel, remains a valid representation of the part of the scene it initially represents. When rendering 3D scenes, it is to be expected that pixels representing parts of the scene more distant from the point of view will generally have higher persistence of validity than those representing nearer parts of the scene.

SUMMARY

According to a first aspect of the present invention there is provided a method for reducing the effects of latency in an extended reality (XR) experience, the method comprising:
i) distinguishing between two types of imagery to be rendered;
ii) differentially computing and communicating data, dependent upon the imagery type, such that:
   a) when the imagery is of a first type it is rendered in a known frame of reference by a server and sent from the server to a user's device where it is transformed to a second frame of reference by the user's device and re-rendered; and
   b) when the imagery is of a second type it is rendered locally by the user's device; and
iii) compositing the first type imagery and the second type imagery, by the user device.

In one embodiment the first type imagery is background or distant imagery.

In another embodiment the second type imagery is fast-moving imagery, fast-changing imagery, or imagery very close to a user's point of view relative to the first type imagery.

The XR experience may be an augmented reality (AR), mixed reality (MR) or virtual reality (VR) experience.

Preferably but not exclusively the device is untethered from local hardware.

In one embodiment a geometry of second type imagery, including positional and animation data, are streamed, and the second type imagery is rendered directly on user device.

In another embodiment a geometry of second type imagery, including material information and lighting information are streamed, and the second type imagery is rendered directly on user device.

In yet another embodiment the image is rendered by the server in a known frame of reference and sent to user's device as a partially rendered image, and not as the final image that is seen by the user. This is particularly beneficial where attributes of an object are viewpoint sensitive, such as, colour, diffuse lighting and/or specular lighting metadata as these can be reconstructed on the user's device. Thus, for example, depth and/or colour information in a known frame of reference may be sent to user's device and two separate views may be reconstructed from the information (one for each eye).

In yet a further embodiment sound information along with sufficient data and metadata is sent from a server to users' device so that as a first user changes his or her position, point of view, or angle of view, correct stereo sound will be sent to user's device.

To further improve performance a user's device may constantly check whether it needs to keep all cached information and is programmed to discard redundant information.

The method can take advantage of the fact, based on a view point of the user, they will not see all of an image. Thus, the amount of metadata sent to a user's device, and the amount of bandwidth used in images, may be minimized based on the viewpoint of the user.

In accordance with a further aspect of the present invention, there is provided a method for reducing the effects of latency in extended reality experiences using a split latency approach, the method comprising: determining the type of imagery to be rendered; when the imagery is determined to be background or distant imagery, rendering the imagery in world space by a server; sending the imagery to a client device by the server; and re-rendering the imagery and transforming the world space to camera space by the client device; when the imagery is determined to be fast-moving, fast-changing, or near imagery, rendering the image locally by the client device; and compositing the background or distant imagery and the fast-moving or near imagery by the client device.

In accordance with an independent second aspect of the present invention there is provided a method of transmitting image data and associated meta data comprising steps ensuring:
i) a graphic processing unit (GPU) is sent rendering commands to generate an image-frame; and
ii) additionally, the GPU is sent commands to embed meta data providing information which facilitates the association of image-frame-specific information with an image-frame.

In one embodiment the image-frame-specific information is camera position and/or orientation information.

Preferably, a floating-point representation, including position and/or orientation data, is converted into a binary representation which the GPU represents.

More preferably the GPU represents the data as one or a group of barcodes. This data is, in a preferred embodiment, incorporated in a corner of the image.

Where the users GPU extracts the metadata to facilitate recompositing of the image, it may optionally be sent to the user's CPU.

Preferably information defining the known frame of reference is encoded in the image sent.

Typically, the known frame of reference is stationary or inertial (quasi-stationary). In such cases the frame of reference will have an absolute angular velocity which is sufficiently small such that images rendered have a high persistence of validity.

In another embodiment, the imagery of the first type is stored on the user device in a frame of reference that is consistent over time, such that each image element sent from the server to the user device is transformed from its own frame of reference to the storage frame, and updates the stored imagery for later transformation into camera space.

In another embodiment, where the rendered image is a spherical image or a partially updated spherical image that is not dependent upon the user's device's camera direction, server sends the imagery to user's device and user's device re-renders the imagery taking into account rotational and positional offset of user's device in order to transform it from a known frame of reference to second frame of reference e.g. camera space on the user's device.

According to a further aspect of the present invention there is provided a computer program programmed to facilitate the method of the invention.

According to a further aspect of the present invention there is provided a system comprising one or more XR devices, a server, a database and a network which contain software to facilitate the method of the invention.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

The following detailed description includes references to the accompanying drawings, which form a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, other embodiments can be utilized, or structural changes can be made without departing from the scope of what is claimed. The following detailed description is, therefore, not to be taken in a limiting sense, and the scope is defined by the appended claims and their equivalents.

The techniques of the embodiments disclosed herein may be implemented using a variety of technologies. For example, the methods described herein may be implemented in software executing on a computing system or in hardware utilizing either a combination of microprocessors or other specially designed application-specific integrated circuits, programmable logic devices, or various combinations thereof. In particular, the methods described herein may be implemented by a series of computer-executable instructions residing on a storage medium, such as a disk drive or computer-readable medium. It should be noted that methods disclosed herein can be implemented by a computer (e.g., a desktop computer, a tablet computer, a laptop computer, and so forth), a game console, a handheld gaming device, a cellular phone, a smart phone, a smart television system, and so forth. Different deployment architectures include servers in-the-cloud, in-house, or hybrid.

A virtual reality (VR) scenario involves presentation of digital or virtual image information without transparency to other actual real-world visual input. Multiple people can interact in real time using three-dimensional spatial information. Furthermore, augmented reality (AR) is a (live) direct or indirect view of a physical, real-world environment (e.g., reality, real world, etc.) whose elements are augmented (or supplemented) by computer-generated sensory input such as sound, video, graphics, haptic feedback, and the like. AR can enhance users' (current) perception of their surroundings. For example, computer-provided sensory inputs to the user (e.g., images, sounds, and sensations) are overlaid on the real world. The computer-provided sensory inputs can be virtual and/or real (e.g., other real sensed or measured information).

Figure 1:
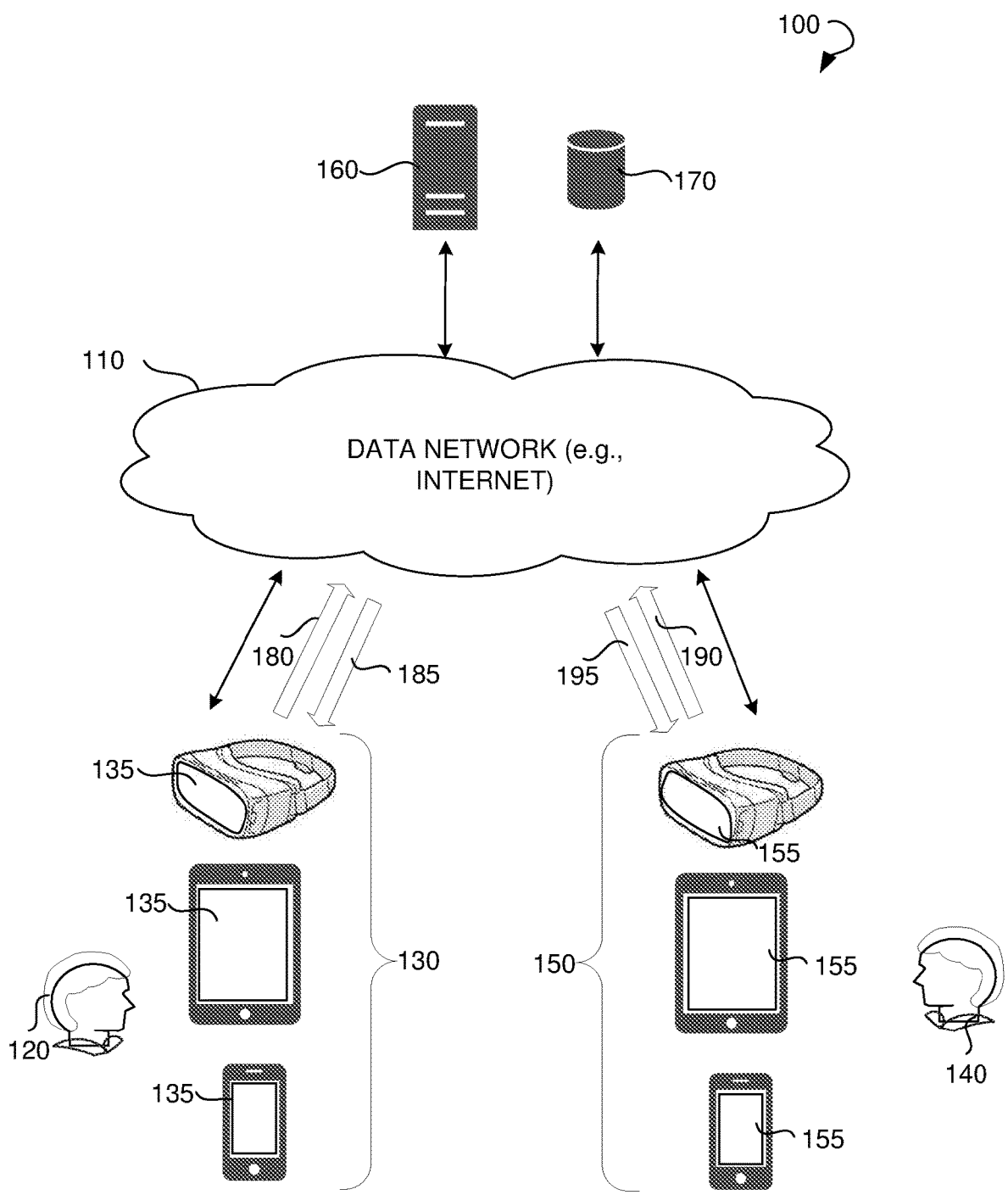
FIG. 1 illustrates a block diagram showing an environment within which methods and systems for reducing the effects of latency of XR experiences using a split latency approach can be implemented, in accordance with an example embodiment.

Referring now to the drawings, FIG. 1 illustrates an environment (100) within which methods and systems for reducing the effects of latency of XR experiences using a split latency approach can be implemented. The environment (100) may include a data network (110) (e.g., an Internet), a first user (120), one or more user devices (130) associated with the first user (120), a second user (140), one of more user devices (150) associated with the second user (140), a server (160), and a database (170).

The first user (120) may include a person such as a consumer, a gamer, and any other person that would like to participate in an XR experience. The user devices (130) (also referred to herein as XR-enabled devices) associated with the first user (120) may include a headset, a tablet PC, a smartphone, and so forth. The headset may include head-mounted display (HMD) and on-device processing. In some embodiments, the headset may be a VR headset, a VR headset compatible with a smartphone (i.e., Samsung Gear VR, Google Daydream, etc.), a VR headset built on mobile technology (i.e., Oculus Quest, etc.), AR glasses, contact lenses, an AR-enabled windshield, and any other mobile XR-enabled device. The headset may be used in conjunction with one or more controllers, gamepad, joystick, keyboard, keypad, glove controller, and the like.

The XR-enabled device (130) may be equipped with various sensors, such as a camera, a GPS module, an accelerometer, a switch, a gyroscope, a solid state compass, haptic feedback device, microphone, and the like, singly and in combination. The sensors may be configured to determine the location and orientation of the XR-enabled device (130) and sense interaction with a second user (140) with another XR-enabled device (150), and so forth. Each of the user devices (130) may include a user application (135).

The second user (140) may include a person such as a consumer, a gamer, and any other person that would like to participate in an XR experience. The user devices (150) associated with the second user (140) may also include a headset, a tablet PC, a smartphone, and so forth. Each of the user devices (150) may include a user application (155).

Each of the first user devices (130) and second user devices (150) may be connected to the data network (110). The data network (110) may include the Internet or any other network capable of communicating data between devices. Suitable networks may include or interface with any one or more of, for instance, a local intranet, a corporate data network, a data center network, a home data network, a Personal Area Network, a Local Area Network (LAN), a Wide Area Network (WAN), a Metropolitan Area Network, a virtual private network, a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or a Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The data network can further include or interface with any one or more of a Recommended Standard 232 (RS-232) serial connection, an IEEE-1394 (FireWire) connection, a Fiber Channel connection, an IrDA (infrared) port, a Small Computer Systems Interface connection, a Universal Serial Bus (USB) connection or other wired or wireless, digital or analog interface or connection, mesh or Digi® networking. The data network (110) may include a network of data processing nodes, also referred to as network nodes, that may be interconnected for the purpose of data communication.

Each of the first and second user devices (130; 150) may be connected to server (160). The server (160) may include a personal computer, a high-powered PC, and web service server, e.g., Apache web server. Each of the first and second user devices (130; 150) may further be connected to a database (170). In an example embodiment, the information related to the first user (120) and the second user (140) may be stored in the database (170).

The first user (120) may use one of the user applications (135) running on one of the user devices (130) to provide control inputs (180) to server (160) and receive control outputs (185). In some embodiments, client device (130) is connected to server (160) via WiFi. Server (160) renders imagery in a known frame of reference. In some embodiments, this may be a frame of reference which can be considered stationary or inertial, for example, the main frame of reference for the virtual environment; this is referred to as "world space" or "streamed space". In some embodiments, a key property of world space is that its absolute angular velocity is sufficiently small that images rendered in that frame of reference have a high persistence of validity. In some embodiments, the rendered image can be a spherical image or a partially updated spherical image that is not dependent on the camera direction. For example, server (160) can spherically render background scenery. Server (160) sends the imagery to a first users device (130), and first users device (130) re-renders the imagery, taking into account the rotational and positional offset of the first user's (120) head in order to transform it from world space to camera space of a user's device (130) and present two views in stereoscopic form to the first user's (120) eyes.

For scene imagery that is moving very quickly, is very close to the first users (120) point of view, or anything subject to fast, sudden change (i.e., a rendered television screen), the geometry of these objects, such as positional and animation data, are streamed, and the objects are rendered directly on user device (130). The objects rendered directly on user device (130) are composited with the background spherical image, resulting in a seamless or near seamless image.

For example, if presenting a street scene to first user (120), the background imagery, such as the street, buildings, sky, and trees are rendered by the server (160) in world space (220). As an object, for example, a passing car, moves close to first users (120) point of view, the geometry of the car is sent to users device (130), including material information and lighting information, so that the passing car is rendered directly on users device (130). In some embodiments, an algorithm is used to determine what imagery should be rendered remotely on the server (160) (first type imagery) and what imagery should be rendered locally on the users device (130) (second type imagery).

In some embodiments, the image rendered by server (160) in world space and sent to users' device (130) is a partially rendered image and is not the final image that is seen by first user (120). For example, colour and diffuse lighting along with specular lighting metadata, which is more viewpoint sensitive, can be reconstructed on client device (130). In some embodiments, depth information is sent to user's device (130) because there may be a slight stereoscopic effect, even on distant objects up to 30 to 50 meters. In order to collectively render both views for the left and right eye of first user (120), depth information in the background world space image is sent to client device (130) and the two separate views are able to be reconstructed from the depth information and the colour information to produce a correct composite because closer objects rendered directly on users device (130) will have a more obvious stereoscopic effect.

In some embodiments, sound information along with sufficient data and metadata is sent from server (160) to users device (130) so that as first user (120) changes his or her position, point of view, or angle of view, correct stereo sound will be sent to user device (130). Furthermore, metadata can be sent from server (160) to users' device (130) to perform partial reconstructing of shadows and lighting. For example, users device (130) can reconstruct shadows that a user-device-rendered object would cast on a background spherical scene and vice versa, or users device (130) can reconstruct the lighting effects emitted or reflected from a user-device-rendered object onto a surrounding scene and vice versa to produce a seamless composite.

User device (130) may send control information and positional information back to server (160) in order to change the point of view from which server (160) is rendering from. As first user (120) moves with user device (130), the world space spherical image is updated and an ongoing algorithm determines what geometry, if any, should be sent to users' device (130). In some embodiments, user device (130) stores a certain amount of geometry and metadata cache. However, user device (130) generally does not download whole scenes from server (160) to render, except, for example, in edge cases. User device (130) may constantly check whether it needs to keep all cached information and may discard unnecessary information. In some embodiments, the control information sent by user device (130) back to server (160) can be informal, arbitrary, or application specific control information.

In some embodiments, the amount of data sent to user device (130) and the amount of bandwidth used in images is minimized. For example, if user device (130) is facing north, the amount of rendering of the south-facing portion of the image can be minimized. Image rendering can adapt based on the updated viewpoints of user device (130).

With XR experiences and immersive technology, if latency is not below approximately 20 milliseconds, this leads to nausea and a sense of dislocation, destroying the sense of immersion.

The invention facilitates a low latency immersive XR experience by rendering selective (first type) imagery to e.g. world space and adapting the imagery to camera space on the local user device rather than on the server. Additionally, selective (second type) imagery, such as, near and fast-moving geometry is rendered locally on the user device, the latency experienced by the user of these aspects of the scene is low. This "spit latency" approach overcomes latency problems.

For example, the latency of objects rendered locally on the user device is similar to the latency experienced in conventional mobile XR applications. Generally, the latency of objects rendered locally on the client device is below 20 milliseconds. On the other hand, the latency experienced by a user for more distant parts of a scene or for more advanced control inputs that need to be sent to the server in order to receive a response would be higher, for example, like standard gaming streaming latency (up to 150 milliseconds). However, this degree of latency is acceptable for aspects that do not break immersion.

Using such an approach allows the compositing of imagery sent from the server and re-rendered on the client device and imagery rendered locally on the client device to be accomplished, in some exemplary embodiments, within 10 milliseconds or less.

In some embodiments, multiple users, for example, first user (120) and second user (140), with user devices (130) and (150), respectively, can participate in the same XR experience. Server (160) can send imagery to first user (120) and second user (140) within a single XR environment in order to share common workflow, and server (160) can accept control inputs (180) and (190) from user devices (130) and (150), respectively. In some embodiments, a large number of users can be served by a single XR environment at once, and calculations can be shared between these large numbers of users. Because each user has a different point of view within the XR environment, the imagery and metadata sent to each user will be different.

In some embodiments, data that is generated from user devices (130) and (150) can be sent directly via the network (110) to other user devices (130) and (150) without being first received by the server (160). Such data may include voice communication and associated animation data.

Figure 2:
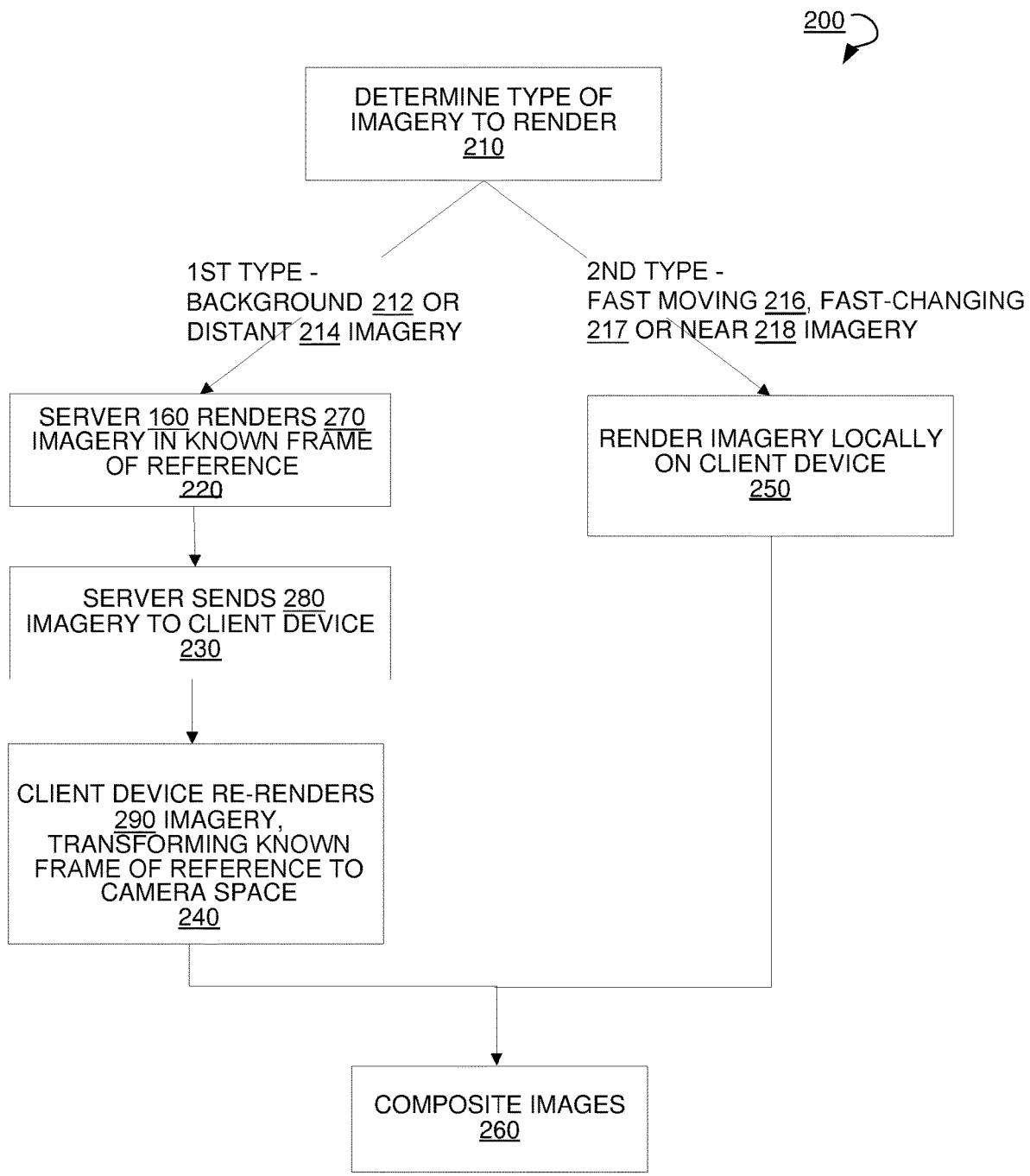
FIG. 2 is a process flow chart representing a split latency approach for reducing the effects of latency of XR experiences, in accordance with an example embodiment.

FIG. 2 is a process flow chart showing a method for reducing the latency of XR experiences using a split latency approach. The method (200) may commence at operation (210) where the type of imagery to be rendered in an XR experience is determined and distinguished. If the imagery is of a first type (212; 214) such as background scenery (212) or distant imagery (214), server (160) renders (270) the imagery in a known frame of reference (220) or world space or stream space. In some embodiments, the rendered image can be a spherical image or a partially updated spherical image that is not dependent on the camera direction.

Server (160) sends (280) the imagery to a user device (130), and user device (130) re-renders (290) the imagery, taking into account the rotational and positional offset of the first use's (120) head in order to transform it from world space (220) to camera space (240) of users device (130) and present two views in stereoscopic form to the first users (120) eyes.

If, on the other hand, the imagery is of a second type (216, 217, 218) such as fast moving imagery (216), fast changing imagery (217) or imagery (218) that is very close to the first user's (120) point of view relative to the first type imagery, the geometry of these objects, such as positional and animation data, is streamed, and the objects are rendered (250) directly on the user device (130).

The split latency streams providing imagery of the first and second type are then composited (260) by the user device (135, 150, 230, 250) compositing for example an object from the second type with a background spherical image from the first type, resulting in a seamless image.

Figure 3:
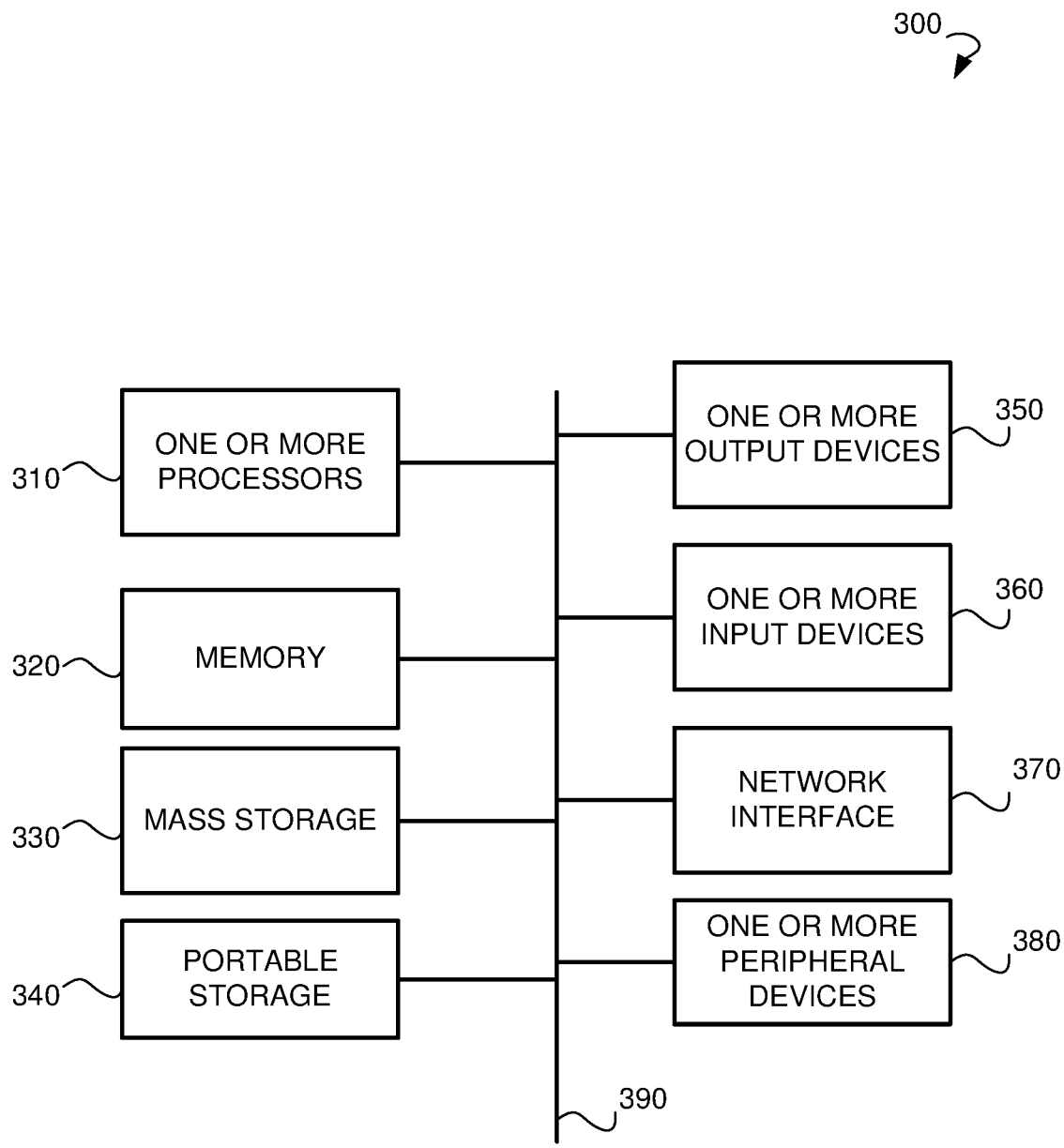
FIG. 3 illustrates a diagrammatic representation of an example machine in the form of a computing system within which a set of instructions for causing the machine to perform any one or more of the methodologies discussed herein is executed.

FIG. 3 illustrates an exemplary computing system (300), such as one or more user devices or one or more servers, that may be used to implement embodiments described herein. The computing system (300) of FIG. 3 may include one or more processors (310) and memory (320). Memory (320) stores, in part, instructions and data for execution by the one or more processors (310). Memory (320) can store the executable code when the computing system (300) is in operation. The computing system (300) of FIG. 3 may further include a mass storage (330), portable storage (340), one or more output devices (350), one or more input devices (360), a network interface (370), and one or more peripheral devices (380).

The components shown in FIG. 3 are depicted as being connected via a single bus (390). The components may be connected through one or more data transport means. One or more processors (310) and memory (320) may be connected via a local microprocessor bus, and the mass storage (330), one or more peripheral devices (380), portable storage (340), and network interface (370) may be connected via one or more input/output (I/O) buses.

Mass storage (330), which may be implemented with a magnetic disk drive or an optical disk drive, is a non-volatile storage device for storing data and instructions for use by a magnetic disk or an optical disk drive, which in turn may be used by the one or more processors (310). Mass storage (330) can store the system software for implementing embodiments described herein for purposes of loading that software into memory (320).

Portable storage (340) operates in conjunction with a portable non-volatile storage medium, such as a compact disk (CD) or digital video disc (DVD), to input and output data and code to and from the computing system (300) of FIG. 3. The system software for implementing embodiments described herein may be stored on such a portable medium and input to the computing system (300) via the portable storage (340).

One or more input devices (360) provide a portion of a user interface. One or more input devices (360) may include an alphanumeric keypad, such as a keyboard, for inputting alphanumeric and other information, or a pointing device, such as a mouse, a trackball, a stylus, or cursor direction keys. Additionally, the computing system (300) as shown in FIG. 3 includes one or more output devices (350). Suitable one or more output devices (350) include speakers, printers, network interfaces, and monitors.

Network interface (370) can be utilized to communicate with external devices, external computing devices, servers, and networked systems via one or more communications networks such as one or more wired, wireless, or optical networks including, for example, the Internet, intranet, LAN, WAN, cellular phone networks (e.g. Global System for Mobile communications network, packet switching communications network, circuit switching communications network), Bluetooth radio, and an IEEE 802.11-based radio frequency network, among others. Network interface (370) may be a network interface card, such as an Ethernet card, optical transceiver, radio frequency transceiver, or any other type of device that can send and receive information. Other examples of such network interfaces may include Bluetooth®, 3G, 4G, and WiFi® radios in mobile computing devices as well as a USB.

One or more peripheral devices (380) may include any type of computer support device to add additional functionality to the computing system (300). One or more peripheral devices (380) may include a modem or a router.

The components contained in the computing system (300) of FIG. 3 are those typically found in computing systems that may be suitable for use with embodiments described herein and are intended to represent a broad category of such computer components that are well known in the art. Thus, the computing system (300) of FIG. 3 can be a PC, handheld computing device, telephone, mobile computing device, workstation, server, minicomputer, mainframe computer, or any other computing device. The computer can also include different bus configurations, networked platforms, multi-processor platforms, and so forth. Various operating systems (OS) can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the example embodiments. Those skilled in the art are familiar with instructions, processor(s), and storage media.

It is noteworthy that any hardware platform suitable for performing the processing described herein is suitable for use with the example embodiments. The terms "computer-readable storage medium" and "computer-readable storage media" as used herein refer to any medium or media that participate in providing instructions to a central processing unit (CPU) for execution. Such media can take many forms, including, but not limited to, non-volatile media, volatile media, and transmission media. Non-volatile media include, for example, optical or magnetic disks, such as a fixed disk. Volatile media include dynamic memory, such as Random Access Memory (RAM). Transmission media include coaxial cables, copper wire, and fiber optics, among others, including the wires that include one embodiment of a bus. Transmission media can also take the form of acoustic or light waves, such as those generated during radio frequency and infrared data communications. Common forms of computer-readable media include, for example, a floppy disk, a flexible disk, a hard disk, magnetic tape, any other magnetic medium, a CD-read-only memory (ROM) disk, DVD, any other optical medium, any other physical medium with patterns of marks or holes, a RAM, a PROM, an EPROM, an EEPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

In some embodiments, the computing system (300) may be implemented as a cloud-based computing environment, such as a virtual machine operating within a computing cloud. In other embodiments, the computing system (300) may itself include a cloud-based computing environment, where the functionalities of the computing system (300) are executed in a distributed fashion. Thus, the computing system (300), when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computing system (300), with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, methods and systems for reducing the effects of latency of XR experiences using a split latency approach have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense. There are many alternative ways of implementing the present technology. The disclosed examples are illustrative and not restrictive.

The invention claimed is:

1. A method for reducing the effects of latency in an extended reality (XR) experience, the method comprising:
   i) distinguishing between two types of imagery to be rendered;
   ii) differentially computing and communicating data, dependent upon the imagery type, such that when the imagery is of:
      a) a first type of the two types of imagery, which is background or distant imagery, it is rendered in a known frame of reference by a server and sent to a user's device from the server where it is transformed to a second frame of reference by the user's device and re-rendered;
      b) a second type of the two types of imagery, which is fast-moving imagery, fast-changing imagery, or imagery very close to a user's point of view relative to the first type imagery, it is rendered locally by the user's device;
   iii) compositing the first type imagery and the second type imagery, by the user device;
   wherein:
   i) a graphic processing unit (GPU) at the server is sent rendering commands, from the server, to generate an image-frame;
   ii) the GPU at the server is sent commands, from the server, to embed metadata providing information that facilitates the association of image-frame-specific information with an image-frame rendered locally by the user's device;
   iii) a user's GPU extracts the metadata to facilitate recompositing of the image by the user's device; and
   wherein the imagery of the first type is stored on the user device, such that the frame of reference is consistent over time, with each image element being sent from the server to the user device where it is transformed from its own frame of reference to the storage frame and it updates the stored imagery for later transformation into camera space.

2. The method as claimed in claim 1, wherein the XR experience is an augmented reality (AR), mixed reality (MR) or virtual reality (VR) experience.

3. The method as claimed in claim 1, wherein the device is untethered from local hardware.

4. The method as claimed in claim 1, wherein a geometry of the second type imagery, including positional and animation data, is streamed from the server to the user's device, and the second type imagery is rendered directly on the user's device.

5. The method as claimed in claim 4, wherein a geometry of the second type imagery, including material information and lighting information, is streamed from the server to the user's device, and the second type imagery is rendered directly on the user's device.

6. The method as claimed in claim 1, wherein the image is rendered by the server in a known frame of reference, sent to user's device as a partially rendered image, and not the final image that is seen by the user, where they are reconstructed on the user's device.

7. The method as claimed in claim 6, wherein attributes that are viewpoint sensitive including at least one of colour, diffuse lighting and specular lighting metadata are rendered by the server in a known frame of reference and sent to user's device as a partially rendered image, and not the final image that is seen by the user, where they are reconstructed on the user's device.

8. The method as claimed in claim 7, where colour information in the known frame of reference is sent to users' device and two separate views are reconstructed from the colour information.

9. The method as claimed in claim 1, wherein sound information along with sufficient position, point of view, or angle of view data and metadata is sent from the server to the user's device so that as the user changes his or her position, point of view, or angle of view, correct stereo sound will be sent to user's device.

10. The method as claimed in claim 1, wherein the user's device constantly checks whether it needs to keep all cached information and discards redundant information.

11. The method as claimed in claim 1, wherein the amount of metadata sent to the user's device, and the amount of bandwidth used in images, is minimized based on the viewpoint of the user.

12. The method as claimed in claim 11, wherein a floating-point representation, including at least one of position and orientation data, is converted into a binary representation which the GPU represents.

13. The method as claimed in claim 12, wherein the GPU represents the data as one or a group of barcodes.

14. The method as claimed in claim 13, wherein the data is incorporated in a corner of the image.

15. The method as claimed in claim 1, wherein the image-frame-specific information is at least one of camera position and orientation information.

16. The method as claimed in claim 1, wherein the recomposited image is sent to a central processing unit (CPU) of the user's device.

17. The method as claimed in claim 1, wherein information defining the known frame of reference is encoded in the image sent.

18. The method as claimed in claim 17, wherein the known frame of reference is stationary or inertial (quasi-stationary).

19. The method as claimed in claim 1, wherein the frame of reference has an absolute angular velocity that is sufficiently small such that images rendered have a high persistence of validity.

20. The method as claimed in claim 1, wherein where a rendered image is a spherical image or a partially updated spherical image that is not dependent upon the user's device's camera direction, the server sends the imagery to the user's device and the user's device re-renders the imagery, taking into account rotational and positional offset of the user's device, to transform it from the known frame of reference to camera space on the user's device.

21. A non-transitory computer-readable medium tangibly embodying computer-executable instructions of a software program, the software program being executable by a processor to provide operations comprising:
   i) distinguishing between two types of imagery to be rendered;
   ii) differentially computing and communicating data, dependent upon the imagery type, such that when the imagery is of:
      a) a first type of the two types of imagery, which is background or distant imagery, it is rendered in a known frame of reference by a server and sent to a user's device from the server where it is transformed to a second frame of reference by the user's device and re-rendered;
      b) a second type of the two types of imagery, which is fast-moving imagery, fast-changing imagery, or imagery very close to a user's point of view relative to the first type imagery, it is rendered locally by the user's device;
   iii) compositing the first type imagery and the second type imagery, by the user device;
   wherein:
   i) a graphic processing unit (GPU) at the server is sent rendering commands, from the server, to generate an image-frame;
   ii) the GPU at the server is sent commands, from the server, to embed metadata providing information that facilitates the association of image-frame-specific information with an image-frame rendered locally by the user's device;
   iii) a user's GPU extracts the metadata to facilitate recompositing of the image by the user's device; and
   wherein where a rendered image is a spherical image or a partially updated spherical image that is not dependent upon the user's device's camera direction, the server sends the imagery to the user's device and the user's device re-renders the imagery, taking into account rotational and positional offset of the user's device, to transform it from the known frame of reference to camera space on the user's device.

22. The non-transitory computer-readable medium as claimed in claim 21, wherein the imagery of the first type is stored on the user device, such that the frame of reference is consistent over time, with each image element being sent from the server to the user device where it is transformed from its own frame of reference to the storage frame and it updates the stored imagery for later transformation into camera space.

23. A system, comprising: one or more XR devices, a server, a database and a network which contain software executable by a processor to provide operations comprising:
   i) distinguishing between two types of imagery to be rendered;
   ii) differentially computing and communicating data, dependent upon the imagery type, such that when the imagery is of:
      a) a first type of the two types of imagery, which is background or distant imagery, it is rendered in a known frame of reference by a server and sent to a user's device from the server where it is transformed to a second frame of reference by the user's device and re-rendered;
      b) a second type of the two types of imagery, which is fast-moving imagery, fast-changing imagery, or imagery very close to a user's point of view relative to the first type imagery, it is rendered locally by the user's device;
   iii) compositing the first type imagery and the second type imagery, by the user device;
   wherein:
   i) a graphic processing unit (GPU) at the server is sent rendering commands, from the server, to generate an image-frame;
   ii) the GPU at the server is sent commands, from the server, to embed metadata providing information that facilitates the association of image-frame-specific information with an image-frame rendered locally by the user's device;
   iii) a user's GPU extracts the metadata to facilitate recompositing of the image by the user's device; and
   wherein the imagery of the first type is stored on the user device, such that the frame of reference is consistent over time, with each image element being sent from the server to the user device where it is transformed from its own frame of reference to the storage frame and it updates the stored imagery for later transformation into camera space.

* * * * *